United States Patent
Madhav et al.

(10) Patent No.: US 11,628,765 B2
(45) Date of Patent: Apr. 18, 2023

(54) SYSTEM AND METHOD FOR ILLUMINATING A MOVING OBJECT WITHIN AN ENCLOSED SPACE

(71) Applicant: THE BOEING COMPANY, Chicago, IL (US)

(72) Inventors: Jagdish T. Madhav, Bothell, WA (US); Dean Hettick, Snohomish, WA (US)

(73) Assignee: THE BOEING COMPANY, Chicago, IL (US)

( * ) Notice: Subject to any disclaimer, the term of this patent is extended or adjusted under 35 U.S.C. 154(b) by 30 days.

(21) Appl. No.: 17/342,594

(22) Filed: Jun. 9, 2021

(65) Prior Publication Data

US 2022/0032840 A1 Feb. 3, 2022

Related U.S. Application Data

(60) Provisional application No. 63/058,609, filed on Jul. 30, 2020.

(51) Int. Cl.
*B60Q 3/47* (2017.01)
*B64D 11/00* (2006.01)
(Continued)

(52) U.S. Cl.
CPC .......... *B60Q 3/47* (2017.02); *B64D 11/0007* (2013.01); *F21V 14/02* (2013.01); *F21V 21/14* (2013.01);
(Continued)

(58) Field of Classification Search
CPC .......... B64D 11/0007; B64D 2203/00; F21V 23/0471; F21V 14/025
See application file for complete search history.

(56) References Cited

U.S. PATENT DOCUMENTS 10,365,546 B1 7/2019 Madhav
2014/0313751 A1 10/2014 Abel
(Continued)

FOREIGN PATENT DOCUMENTS

EP 3000658 3/2016
WO WO 2017/155575 9/2017

OTHER PUBLICATIONS

Extended European Search Report for EP 21183930.3-1012, dated Dec. 21, 2021.

*Primary Examiner* — Karabi Guharay
(74) *Attorney, Agent, or Firm* — The Small Patent Law Group LLC; Joseph M. Butscher

(57) ABSTRACT

A system for illuminating at least a portion of an object within an enclosed space includes an object configured to be moved within the enclosed space, and a beacon coupled to the object. The beacon is configured to emit a light tracking signal. A light sensor is configured to detect the light tracking signal emitted from the beacon. A lighting control unit in communication with the light sensor is configured to determine a position of the object within the enclosed space based on the light tracking signal as detected by the light sensor. A lighting assembly is in communication with the lighting control unit. The lighting control unit is configured to operate the lighting assembly to emit the illuminating light onto the at least a portion of the object based on the light tracking signal as detected by the light sensor. The system may also be configured to guide a passenger to a seat, and provide way-finding illumination.

20 Claims, 12 Drawing Sheets

(51) Int. Cl.
*F21V 14/02* (2006.01)
*F21V 21/14* (2006.01)
*F21V 23/04* (2006.01)
*F21Y 115/10* (2016.01)

(52) U.S. Cl.
CPC ...... *F21V 23/0471* (2013.01); *B64D 2203/00* (2013.01); *F21Y 2115/10* (2016.08)

(56) References Cited

U.S. PATENT DOCUMENTS

| | | |
|---|---|---|
| 2016/0353551 A1* | 12/2016 | Despres ................. B60Q 3/47 |
| 2018/0273178 A1 | 9/2018 | Ibrahim |
| 2019/0053653 A1 | 2/2019 | Hills |
| 2019/0054996 A1 | 2/2019 | Ibrahim |
| 2019/0291637 A1 | 9/2019 | Pozzi |

\* cited by examiner

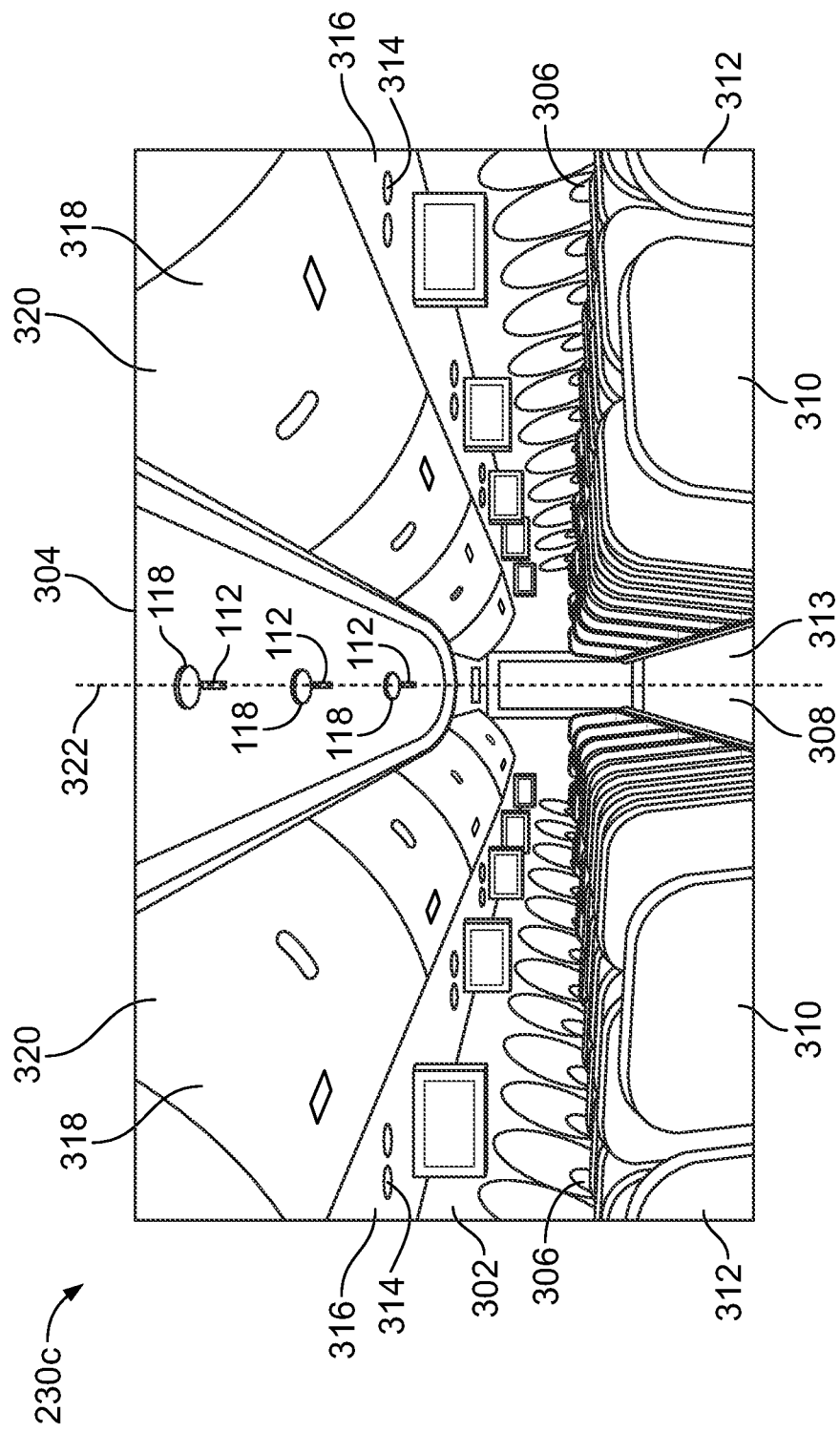

SYSTEM AND METHOD FOR ILLUMINATING A MOVING OBJECT WITHIN AN ENCLOSED SPACE

RELATED APPLICATIONS

This application relates to and claims priority benefits from U.S. Provisional Patent Application No. 63/058,609, entitled "System and Method for Illuminating a Moving Object Within an Enclosed Space," filed Jul. 30, 2020, which is hereby incorporated by reference in its entirety.

FIELD OF THE DISCLOSURE

Embodiments of the present disclosure generally relate to systems and methods for illuminating moving objects within an enclosed space, such as an internal cabin of a vehicle.

BACKGROUND OF THE DISCLOSURE

Vehicles such as commercial aircraft are used to transport passengers between various locations. During a flight, an attendant may periodically pass through an internal cabin to distribute refreshments. For example, an attendant may push a galley cart through an aisle of an internal cabin. The galley cart retains beverages and snacks, for example. Passengers may select certain beverages and snacks from the attendant.

Lighting within the internal cabin may be dimmed at various times. For example, during a night flight, the lighting within the cabin may be dimmed in order to provide passengers a more desirable resting experience.

An attendant passing through an internal cabin when the lighting is dimmed may have difficulty seeing items on or within a galley cart or tray. As such, the attendant may use a handheld flashlight, for example, to provide illumination in relation to the galley cart or the tray. However, by holding the flashlight, the attendant is unable to use both hands in relation to the galley cart. As such, using a flashlight to illuminate a work surface (such as on a galley cart or tray) during a flight may be awkward.

At the same time, providing increased illumination within the internal cabin to allow the attendant to more easily see a work surface may disturb certain passengers who are trying to rest. For example, light emitted from overhead lighting devices may flood over portions of the internal cabin in which passengers desiring to rest are seated.

SUMMARY OF THE DISCLOSURE

A need exists for a system and a method for efficiently and effectively illuminating an object within an enclosed space, such as an internal cabin of a vehicle. Further, a need exists for a system and a method that direct illuminating light onto an object without undesirably spilling the light into certain areas of an enclosed space.

With those needs in mind, certain embodiments of the present disclosure provide a system for illuminating at least a portion of an object within an enclosed space. The system includes an object configured to be moved within the enclosed space, and a beacon coupled to the object. The beacon is configured to emit a light tracking signal.

In at least one embodiment, the system further includes a light sensor. The light sensor is configured to detect the light tracking signal emitted from the beacon. As an example, the light sensor includes a circuit board, a linear photo detector array coupled to the circuit board, a lens, and an infrared filter disposed between the photo detector array and the lens.

In at least one embodiment, a lighting control unit is in communication with the light sensor. The lighting control unit is configured to determine a position of the object within the enclosed space based on the light tracking signal as detected by the light sensor.

In at least one embodiment, a lighting assembly is in communication with the lighting control unit. The lighting control unit is configured to operate the lighting assembly to emit the illuminating light onto the at least a portion of the object based on the light tracking signal as detected by the light sensor.

In at least one embodiment, the lighting assembly is configured to provide way-finding illumination for individuals within the enclosed space when the light sensor does not detect the light tracking signal.

As an example, the lighting assembly includes a gimbal bracket, a light projector pivotally coupled to the gimbal bracket, and an actuator operatively coupled to the light projector so as to pivot the light projector in relation to the gimbal bracket. As a further example, the lighting assembly also includes a rotatable slide holder that includes one or more slides that are configured to shape the illuminating light.

In at least one embodiment, the lighting control unit is configured to deactivate the lighting assembly when the light sensor no longer detects the light tracking signal.

In an example, the enclosed space is an internal cabin of a vehicle. In an example, the object includes one of a galley cart or a tray. In an example, the beacon is secured to a top surface of the object. In an example, the beacon includes a light emitting diode (LED), and the light tracking signal includes infrared light.

Certain embodiments of the present disclosure provide a method for illuminating at least a portion of an object within an enclosed space. The method includes coupling a beacon to an object configured to be moved within the enclosed space; and emitting a light tracking signal from the beacon.

In at least one embodiment, the method also includes detecting, by a light sensor, the light tracking signal emitted from the beacon. In at least one embodiment, the method also includes determining, by a lighting control unit in communication with the light sensor, a position of the object within the enclosed space based on the light tracking signal as detected by the light sensor. In at least one embodiment, the method also includes operating, by the lighting control unit, a lighting assembly in communication with the lighting control unit, wherein said operating includes operating the lighting assembly to emit the illuminating light onto the at least a portion of the object based on the light tracking signal as detected by the light sensor.

In at least one embodiment, the method also includes providing, by the lighting assembly, way-finding illumination for individuals within the enclosed space when the light sensor does not detect the light tracking signal.

In at least one embodiment, said operating includes deactivating the lighting assembly when the light sensor no longer detects the light tracking signal.

Certain embodiments of the present disclosure provide a vehicle including an internal cabin, and a system for illuminating at least a portion of an object within the internal cabin, as described herein.

BRIEF DESCRIPTION OF THE DRAWINGS

FIG. 8 illustrates a perspective interior view of an internal cabin of an aircraft, according to an embodiment of the present disclosure.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain embodiments of the present disclosure provide a system and a method for illuminating at least a portion of an object that is moved within an enclosed space, such as an internal cabin of a vehicle. In at least one embodiment, the system and method are configured to provide task lighting onto a particular area, such as a work surface of a galley cart or tray being used by a flight attendant, for example. The system and method may also provide lighting guides to passengers, when necessary. For example, when the object (such as a galley cart or tray) is not being used, an attendant may operate a lighting assembly to provide illuminated guidance for passengers, such as during boarding to quickly and easily indicate where a specific passenger seat is located.

Figure 1:
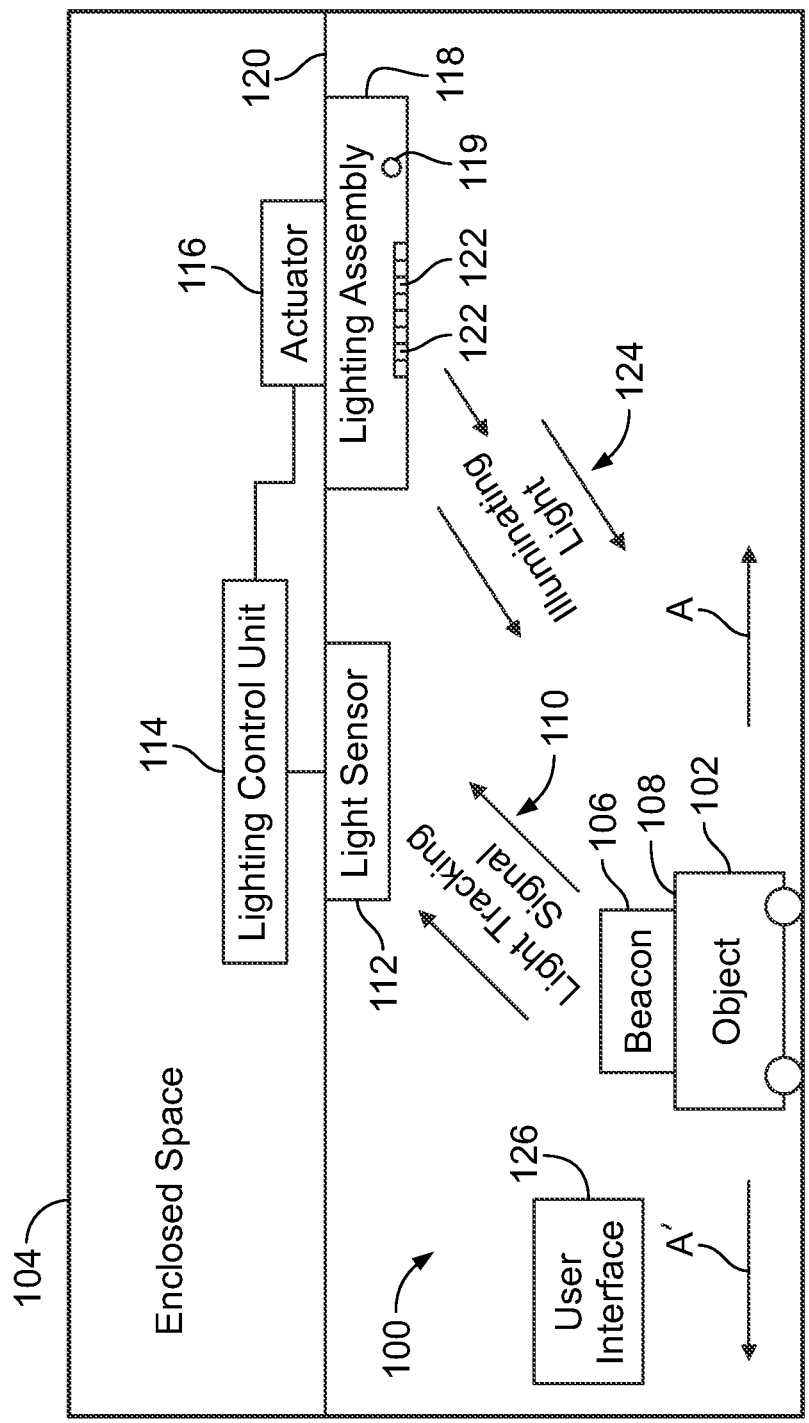
FIG. 1 illustrates a schematic diagram of a system for illuminating at least a portion of an object within an enclosed space, according to an embodiment of the present disclosure.

FIG. 1 illustrates a schematic diagram of a system 100 for illuminating at least a portion of an object 102 within an enclosed space 104, according to an embodiment of the present disclosure. In at least one embodiment, the enclosed space 104 is an internal cabin of a vehicle, such as a commercial aircraft. As an example, the object 102 is a galley cart or tray that is moved through an aisle of the internal cabin. As another example, the enclosed space 104 may be a room within a fixed structure, such as a commercial building, private residence, or the like.

The object 102 is configured to move throughout the enclosed space 104, such as in the direction of arrow A, arrow A', and the like. For example, the object 102 is configured to move through an aisle of an internal cabin in fore and aft directions.

A beacon 106 is positioned on the object 102. For example, the beacon 106 can be secured to a top surface 108 of the object 102. In at least one embodiment, the beacon 106 is affixed to the top surface 108, such as through one or more fasteners, adhesives, and/or the like. As another example, the beacon 106 is placed on the top surface 108, and may be removed.

In at least one embodiment, the beacon 106 is a light emitting device, such as one or more light emitting diodes (LEDs). For example, the beacon 106 can be an LED that is configured to emit infrared light. The beacon 106 emits a light tracking signal 110, such as a Lambertian source, giving an infrared light signal.

The light tracking signal 110 impinges upon and is received by a light sensor 112, which detects the light tracking signal 110. A lighting control unit 114 is in communication with the light sensor 112, such as through one or more wired or wireless connections. The lighting control unit 114 determines a position of the object 102 within the enclosed space through the light tracking signal 110 as detected by the light sensor 112.

The lighting control unit 114 is also in communication with a lighting assembly 118. For example, the lighting control unit 114 is in communication with an actuator 116 of a lighting assembly 118, as well as an activation switch 119 of the lighting assembly 118. As an example, the lighting assembly 118 is a spot light mounted to a ceiling 120 of the enclosed space 104. As another example, the lighting assembly 118 can be an attendant work light, reading light, or the like, within an internal cabin of a vehicle. Further, the lighting assembly 118 can be disposed over an aisle within the internal cabin.

The lighting assembly 118 includes one or more light emitting devices 122. For example, the light emitting devices 122 are or otherwise include one or more LEDs. As another example, the light emitting devices 122 include one or more incandescent bulbs. The light emitting devices 122 are configured to emit illuminating light 124, such as a spot beam of light.

The actuator 116 is or includes one or more motors that are configured to move the lighting assembly 118 in order to direct and redirect the illuminating light 124 at different areas within the enclosed space 104. For example, the actuator 116 is configured to one or more of rotate, pivot, linearly translate, operate a projector in relation to, and/or the like the lighting assembly 118. The lighting control unit 114 is configured to operate the actuator 116 to move the lighting assembly 118 in order to direct the illuminating light 124 at a desired area.

In operation, the lighting control unit 114 operates the actuator 116 to direct the illuminating light 124 emitted by the lighting assembly 118 onto at least a portion of the object 102, such as the top surface 108 or other such work surface. As noted, the lighting control unit 114 determines a position of the object 102 within the enclosed space 104 by the light sensor 112 detecting the light tracking signal 110 emitted from the beacon 106. Based on the position of the object 102, as determined from the detected light tracking signal 110, the lighting control unit 114 operates the actuator 116 to direct the illuminating light 124 onto a portion of the object 102, such as the top surface 108. As the object 102 is moved through the enclosed space, the position of the object 102 is detected by the light sensor 112 from the light tracking signal 110, and the lighting control unit 114 operates the actuator 116 to move the lighting assembly 118 based on the moving position of the object 102 so that the illuminating light 124 is directed onto the portion of the object 102, thereby illuminating the portion of the object 102. In this manner, the system 100 is able to ensure that a work surface of the object 102, such as the top surface 108, is illuminated with focused, illuminating light 124, which does not flood or wash into dimmed areas of the enclosed space. Accordingly, the system 100 is configured to illuminate the portion of the object 102, such as a galley cart or tray, without disturbing individuals within the enclosed space 104, such as those who may be trying to rest.

In at least one embodiment, when the light sensor 112 no longer detects the light tracking signal 110, the lighting control unit 114 may deactivate the light emitting devices 122 of the lighting assembly 118, such as via the activation switch 119. That is, when the light sensor 112 does not detect the light tracking signal 110, the lighting control unit 114 may deactivate the lighting assembly 118 so that the illuminating light 124 is not emitted.

In at least one embodiment, a user interface 126 is in communication with the lighting assembly 118, such as through one or more wired or wireless connections. For example, the user interface 126 can be a fixed or mobile computer station within the enclosed space 104. As another example, the user interface 126 can be a handheld device, such as a smart phone or smart tablet.

In operation, the user interface 126 is used to activate and deactivate the lighting assembly 118. For example, the user interface 126 can be used to activate and deactivate the light emitting devices 122. Further, the user interface 126 can be operated by an individual to selectively activate and deactivate an object illuminating mode. As an example, the user interface 126 can be operated to activate or deactivate automatic illumination of the object 102 within the enclosed space 104, as described herein.

In at least one embodiment, when the object 102 is not being used within the enclosed space 104, the user interface 126 can be engaged to illuminate a specified area within the enclosed space 104. For example, during a passenger boarding process, an attendant may engage the user interface 126 to illuminate an aisle within an internal cabin by a passenger seat. In particular, a passenger may need assistance finding a designated seat. The attendant may operate the lighting assembly 118 via the user interface 126 to illuminate the aisle by the designated seat with the illuminating light 124 as way-finding illuminating light. For example, the way-finding illuminating light may be or include specific colored light, such as blue or green light (emitted by one or more of the light emitting devices 122, such as LEDs), which provides a readily discernable indication to the passenger regarding the location of the designated seat. As such, when the system 100 is not being used to illuminate the portion of the object 102, the system 100 can be used to provide readily discernable illumination of specific locations within the enclosed space 104. Alternatively, the system 100 may not include the user interface 126.

As described herein, the system 100 includes the object 102 that is configured to be moved within an enclosed space 104. The beacon 106 is coupled to (for example, integrally formed with, fixed or otherwise secured to, or positioned on) the object 102. The beacon 106 is configured to emit the light tracking signal 110. In at least one embodiment, the system 100 further includes the light sensor 112, which is configured to detect the light tracking signal 110. The lighting control unit 114, which is in communication with the light sensor 112, determines the position of the object 102 within the enclosed space 104 based on the light tracking signal 110 as detected by the light sensor 112. The lighting control unit 114 is further in communication with the lighting assembly 118, and operates the lighting assembly 118 to emit the illuminating light 124 onto at least a portion of the object 102 based on the light tracking signal 110 as detected by the light sensor 112.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the lighting control unit 114 may be or include one or more processors that are configured to control operation of the actuator 116 and the lighting assembly 118, as described above.

The lighting control unit 114 is configured to execute a set of instructions that are stored in one or more data storage units or elements (such as one or more memories), in order to process data. For example, the lighting control unit 114 may include or be coupled to one or more memories. The data storage units may also store data or other information as desired or needed. The data storage units may be in the form of an information source or a physical memory element within a processing machine.

The set of instructions may include various commands that instruct the lighting control unit 114 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the lighting control unit 114. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the lighting control unit 114 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 2:
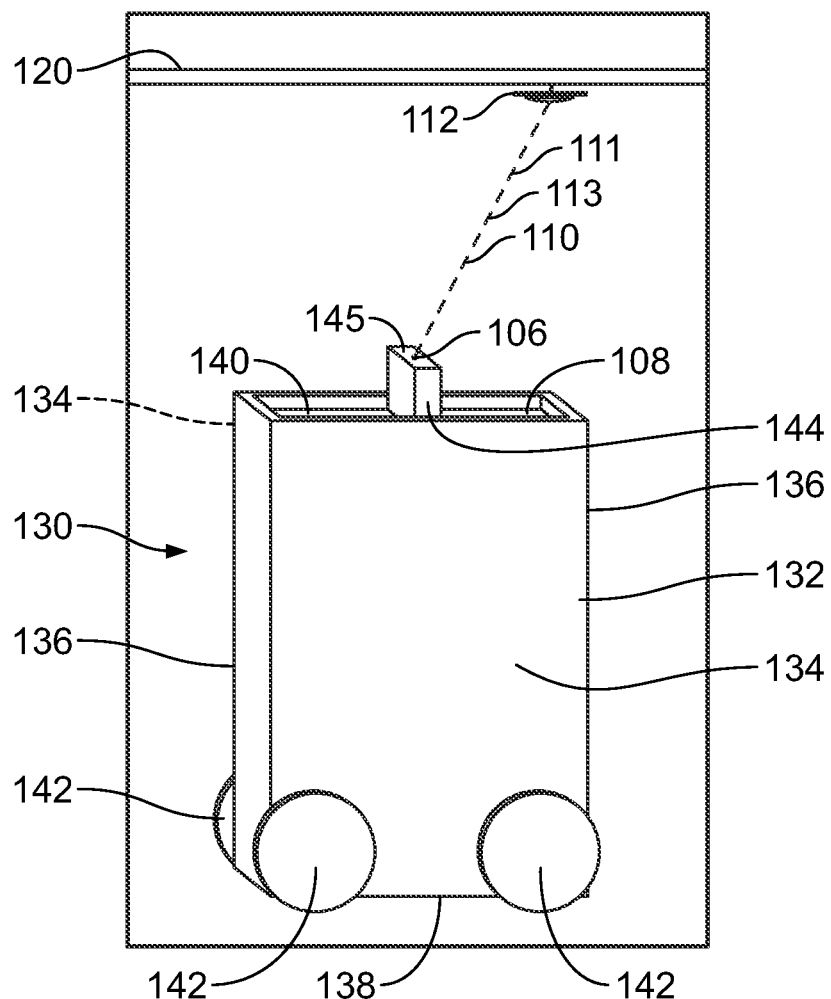
FIG. 2 illustrates a perspective lateral view of a galley cart having a beacon emitting a light tracking signal onto a light sensor, according to an embodiment of the present disclosure.

FIG. 2 illustrates a perspective lateral view of a galley cart 130 having the beacon 106 emitting the light tracking signal 110 onto the light sensor 112, according to an embodiment of the present disclosure. The galley cart 130 is an example of the object 102.

The galley cart 130 includes a main housing 132 having side walls 134 connected to end walls 136, a base 138, and a top wall 140, which includes the top surface 108, such as a worksurface. An internal chamber is defined between the side walls 134, the end walls 136, the base 138, and the top wall 140. The internal chamber is configured to retain beverages, prepared meals, snacks, and/or the like. Wheels 142 are rotatably coupled to the main housing 132, such as through axles. The wheels 142 are configured to allow the galley cart 130 to be rolled through the enclosed space 104 (shown in FIG. 1), such as fore and aft within an aisle of an internal cabin of a vehicle.

The beacon 106 is secured to the top surface 108. For example, a bracket 144 is mounted to the top surface 108. The bracket 144 may be integrally formed with the top surface 108. As another example, the bracket 144 can be secured to the top surface 108 through one or more fasteners, adhesives, and/or the like. The beacon 106 is secured to the bracket 144, such as a top surface 145 of the bracket 144. As another example, the beacon 106 can be secured to the top surface 108 by a post, column, beam, or other such extension. As another example, the beacon 106 can be secured directly to the top surface 108 instead of through an intermediary structure.

In at least one embodiment, the beacon 106 is fixed to the galley cart 130. In at least one other embodiment, the beacon 106 is removably coupled to the galley cart 130, such as through one or more clips, latches, retainers, magnets, or the like. In at least one other embodiment, the beacon 106 is a separate and distinct structure that is selectively positioned on and removed from the top surface 108.

In at least one embodiment, the beacon 106 is one or more infrared LEDs that emits the light tracking signal 110 as an infrared beam having a linear central axis. The light tracking signal 110 impinges upon and is detected by the light sensor 112. For instance, as shown in FIG. 2, the beacon 106 emits an infrared beam 111 having a linear central axis 113, and the infrared beam 111 impinges upon and is detected by the light sensor 112. As shown, the light sensor 112 may be mounted to an underside of the ceiling 120. The light sensor 112 may be disposed over an aisle of an internal cabin of a vehicle.

Figure 3:
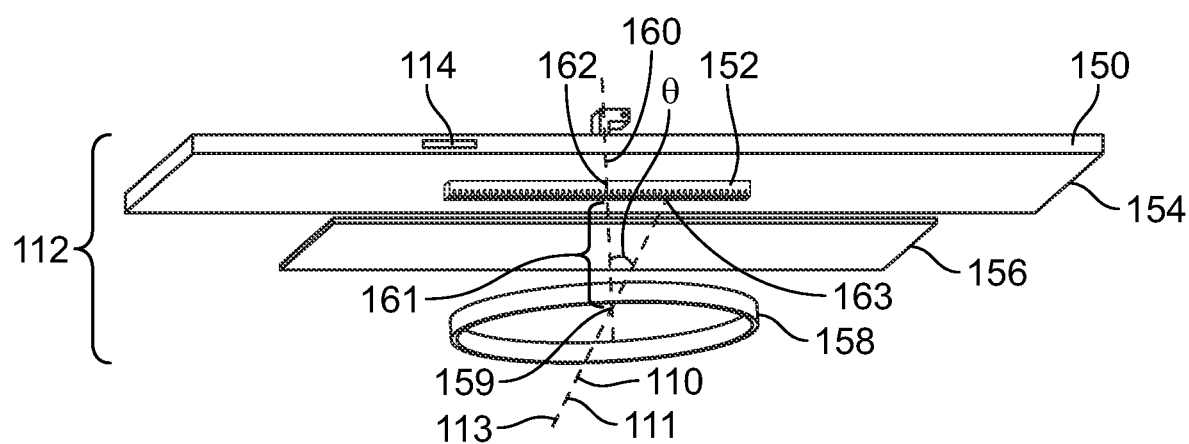
FIG. 3 illustrates a perspective view of a light sensor, according to an embodiment of the present disclosure.

FIG. 3 illustrates a perspective view of the light sensor 112, according to an embodiment of the present disclosure. In at least one embodiment, the light sensor 112 includes a circuit board 150 having a linear photo detector array 152 secured to an underside 154 of the circuit board 150. The photo detector array 152 can be a charge-coupled device (CCD), a complementary metal oxide semiconductor (CMOS), or the like. In at least one embodiment, the lighting control unit 114 is secured on or within the circuit board 150. In at least one other embodiment, the lighting control unit 114 is separate and distinct from the circuit board 150.

An infrared filter 156 is disposed between the photo detector array 152 and a lens 158. The infrared filter 156 filters light so that infrared light, such as the infrared beam 111, impinges on the photo detector array 152. For example, the infrared filter 156 matches infrared rays emitted from the beacon 106 and blocks other stray signals and light rays.

In operation, the light tracking signal 110, such as the infrared beam 111 emitted from the beacon 106 (shown in FIGS. 1 and 2) passes through the lens 158 and the infrared filter 156 onto a specific location of the photo detector array 152. The lighting control unit 114 detects an intersection 159 of the central axis 113 of the infrared beam 111 at the lens 158 and a vertical line 160 that passes through a center 162 of the photo detector array 152 and the lens 158 (such as a center of the lens 158). The intersection 159 forms an angle θ between the central axis 113 and the vertical line 160. Further, the distance 161 of the vertical line 160 between the photo detector array 152 and the lens 158 is known. As such, in an example, the lighting control unit 114 determines the position 163 where the central axis 113 impinges on the photo detector through the following equation:

$$\text{Position (163) on photo detector array (152)} = \tan\theta \times \text{distance 161}$$

In this manner, the lighting control unit 114 is able to determine the position 163 on the photo detector array 152. The lighting control unit 114 then correlates the position 163 with the position of the object 102 within the enclosed space 104. Optionally, the lighting control unit 114 may determine the position of the object 102 within the enclosed space 104 directly from the position where the light tracking signal 110 impinges on the photo detector array 152.

Optionally, the light sensor 112 may not include the lens 158. For example, instead of a lens, the light sensor 112 may include a hole (such as having a diameter of 5 inches or less) through which the light tracking signal 110 is received. As another example, instead of the photo detector array 152, the light sensor 112 may include a camera that obtains images of the light tracking signal 110 emitted from the beacon 106.

Figure 4:
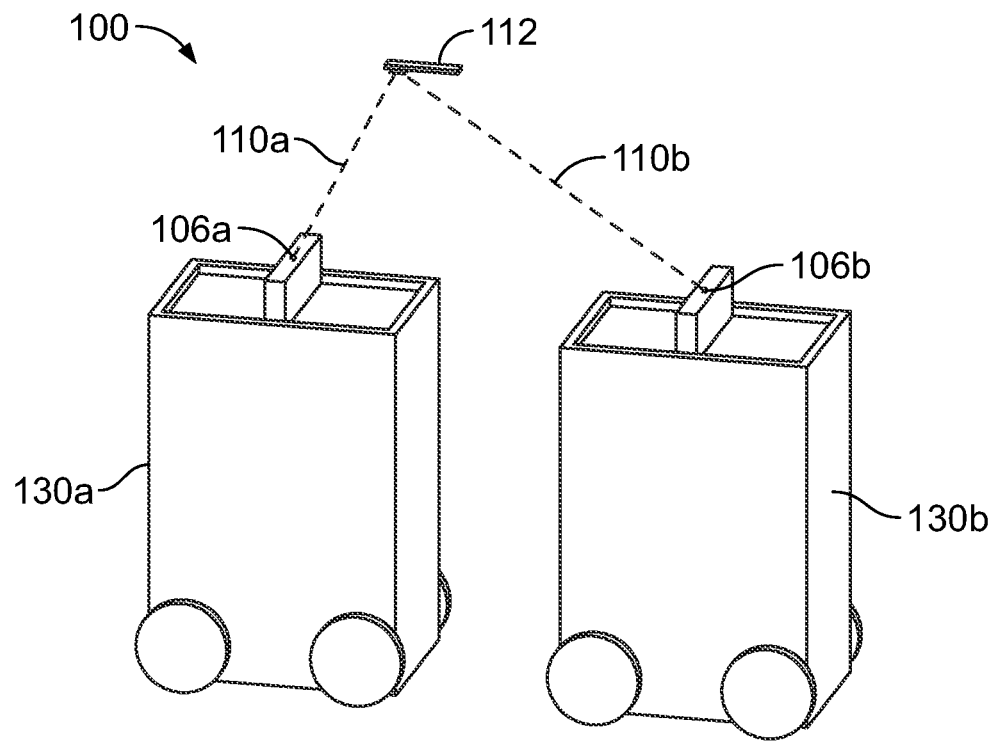
FIG. 4 illustrates a perspective view of a first galley cart and a second galley cart in relation to a light sensor, according to an embodiment of the present disclosure.

FIG. 4 illustrates a perspective view of a first galley cart 130a and a second galley cart 130b in relation to the light sensor 112, according to an embodiment of the present disclosure. The first galley cart 130a includes a first beacon 106a that emits a first light tracking signal 110a, and the second galley cart 130b includes a second beacon 106b that emits a second light tracking signal 110b.

Figure 5:
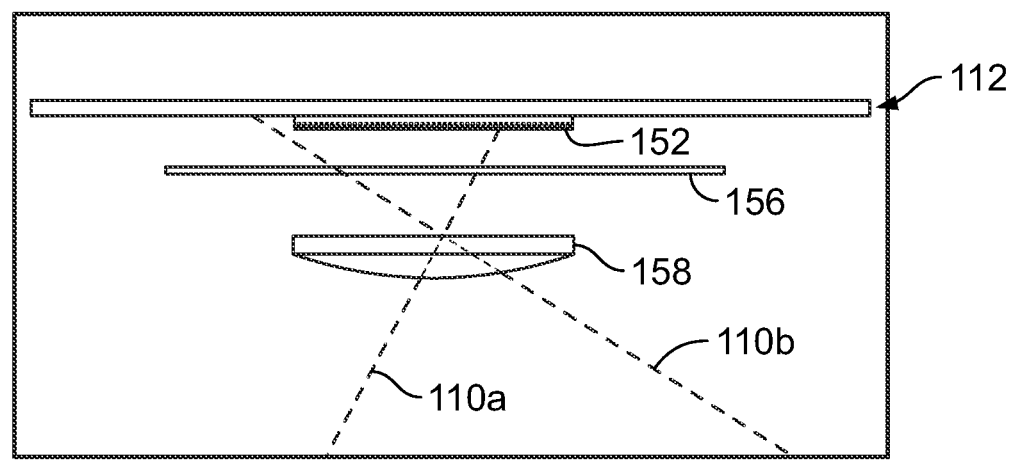
FIG. 5 illustrates a lateral view of a first light tracking signal and a second light tracking signal in relation to a light sensor, according to an embodiment of the present disclosure.

FIG. 5 illustrates a lateral view of the first light tracking signal 110a and the second light tracking signal 110b in relation to the light sensor 112. Referring to FIGS. 4 and 5, the light sensor 112, the first galley cart 130*a*, and the second galley cart 130*b* may be sized, shaped, and configured such that only one of the first light tracking signal 110*a* or the second light tracking signal 110*b* impinges on a detecting portion of the light sensor 112 at any one time. For example, as shown in FIG. 5, the first light tracking signal 110*a* impinges upon the photo detector array 152, but the second galley cart 130*b* is too far away from the light sensor 112 for the second light tracking signal 110*b* to impinge upon the photo detector array 152. As such, in at least one embodiment, the lighting control unit 114 (shown in FIGS. 1 and 3) may control a lighting assembly 118 in relation to only one galley cart 130*a* or 130*b* at any one time. Further, the enclosed space 104 may include a plurality of systems 100, with each system 100 having a respective light sensor 112 and a respective lighting assembly 118 so that illumination of moving galley carts 130*a* and 130*b* is handed off between neighboring systems 100.

Figure 6:
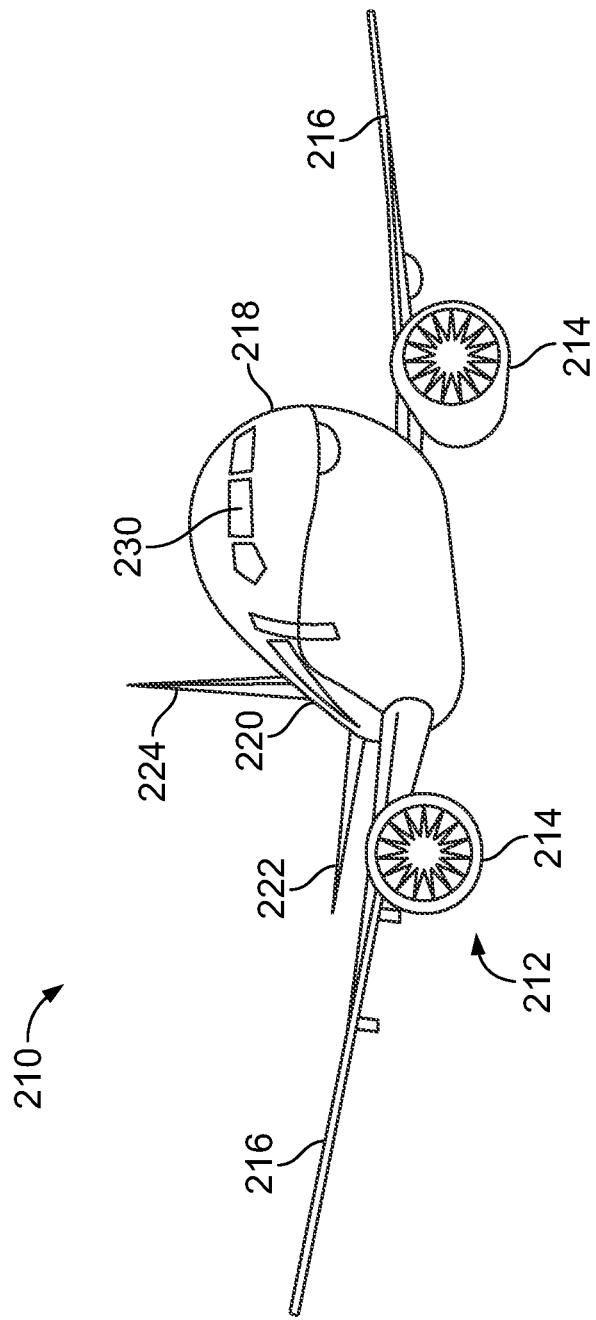
FIG. 6 illustrates a perspective front view of an aircraft, according to an embodiment of the present disclosure.

FIG. 6 illustrates a perspective front view of an aircraft 210, according to an embodiment of the present disclosure. The aircraft 210 includes a propulsion system 212 that includes engines 214, for example. Optionally, the propulsion system 212 may include more engines 214 than shown. The engines 214 are carried by wings 216 of the aircraft 210. In other embodiments, the engines 214 may be carried by a fuselage 218 and/or an empennage 220. The empennage 220 may also support horizontal stabilizers 222 and a vertical stabilizer 224.

The fuselage 218 of the aircraft 210 defines an internal cabin 230, which includes a flight deck or cockpit, one or more work sections (for example, galleys, personnel carry-on baggage areas, and the like), one or more passenger sections (for example, first class, business class, and coach sections), one or more lavatories, and/or the like. The internal cabin 230 is an example of, or otherwise includes, an enclosed space, such as the enclosed space 104 shown in FIG. 1.

Alternatively, instead of an aircraft, embodiments of the present disclosure may be used with various other vehicles, such as automobiles, buses, locomotives and train cars, watercraft, and the like. Further, embodiments of the present disclosure may be used with respect to fixed structures, such as commercial and residential buildings.

Figure 7A:
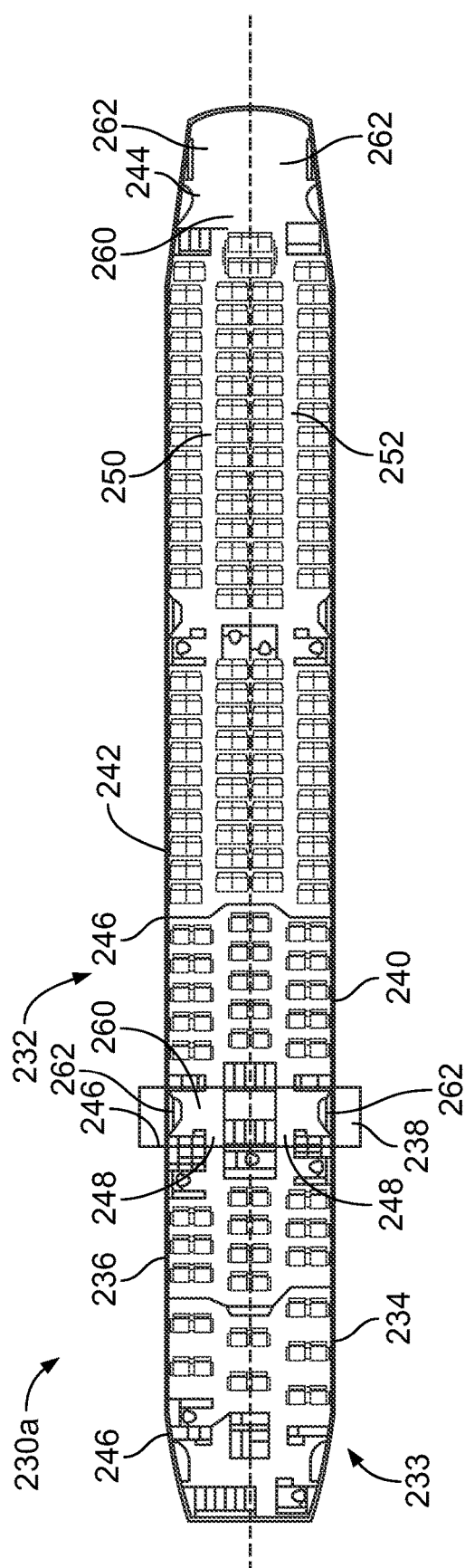
FIG. 7A illustrates a top plan view of an internal cabin of an aircraft, according to an embodiment of the present disclosure.

FIG. 7A illustrates a top plan view of an internal cabin 230*a* of an aircraft, according to an embodiment of the present disclosure. The internal cabin 230*a* is an example of the internal cabin 230 shown in FIG. 6. The internal cabin 230*a* may be within the fuselage 232 of the aircraft. The fuselage 232 is an example of the fuselage 218 of FIG. 6. In an example, one or more fuselage walls may define the internal cabin 230*a*. The internal cabin 230*a* includes multiple sections, including a front section 233, a first class section 234, a business class section 236, a front galley station 238, an expanded economy or coach section 240, a standard economy of coach section 242, and an aft section 244, which may include multiple lavatories and galley stations. It is to be understood that the internal cabin 230*a* may include more or less sections than shown. For example, the internal cabin 230*a* may not include a first class section, and may include more or less galley stations than shown. Each of the sections may be separated by a cabin transition area 246, which may include class divider assemblies between aisles 248.

As shown in FIG. 7A, the internal cabin 230*a* includes two aisles 250 and 252 that lead to the aft section 244. Optionally, the internal cabin 230*a* may have less or more aisles than shown. For example, the internal cabin 230*a* may include a single aisle that extends through the center of the internal cabin 230 that leads to the aft section 244. In at least one embodiment, light sensors 112 and lighting assemblies 118 (as shown and described in FIG. 1, for example) can be disposed over the aisles 250 and/or 252.

The aisles 248, 250, and 252 extend to door passageways or egress paths 260. Exit doors 262 are located at ends of the egress paths 260. The egress paths 260 may be perpendicular to the aisles 248, 250, and 252. The internal cabin 230 may include more egress paths 260 at different locations than shown.

Figure 7B:
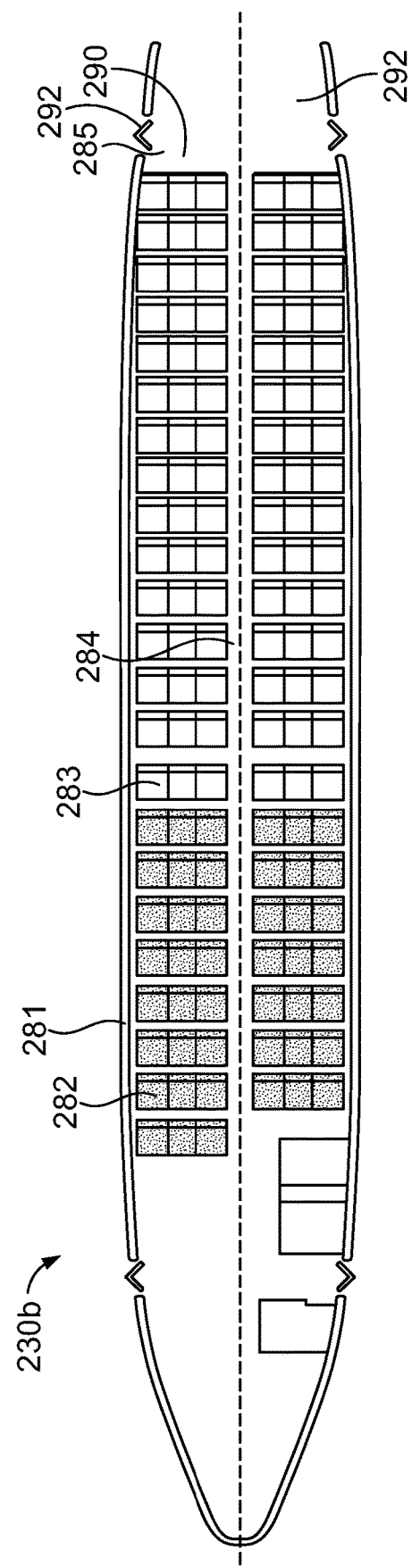
FIG. 7B illustrates a top plan view of an internal cabin of an aircraft, according to an embodiment of the present disclosure.

FIG. 7B illustrates a top plan view of an internal cabin 230*b* of an aircraft, according to an embodiment of the present disclosure. The internal cabin 230*b* is an example of the internal cabin 230 shown in FIG. 6. The internal cabin 230*b* may be within a fuselage 281 of the aircraft. The fuselage 281 is an example of the fuselage 218 of FIG. 6. In an example, one or more fuselage walls may define the internal cabin 230*b*. The internal cabin 230*b* includes multiple sections, including a main cabin 282 having passenger seats 283, and an aft section 285 behind the main cabin 282. It is to be understood that the internal cabin 230*b* may include more or less sections than shown.

The internal cabin 230*b* may include a single aisle 284 that leads to the aft section 285. The single aisle 284 may extend through the center of the internal cabin 230*b* that leads to the aft section 285. For example, the single aisle 284 may be coaxially aligned with a central longitudinal plane of the internal cabin 230*b*.

The aisle 284 extends to a door passageway or egress path 290. Exit doors 292 are located at ends of the egress path 290. The egress path 290 may be perpendicular to the aisle 284. The internal cabin 230*b* may include more egress paths than shown. In at least one embodiment, light sensors 112 and lighting assemblies 118 (as shown and described in FIG. 1, for example) can be disposed over the aisle 284.

FIG. 8 illustrates a perspective interior view of an internal cabin 230*c* of an aircraft, according to an embodiment of the present disclosure. The internal cabin 230*c* is an example of the internal cabin 230 shown in FIG. 6. The internal cabin 230*c* includes outboard walls 302 connected to a ceiling 304. Windows 306 may be formed within the outboard walls 302. A floor 308 supports rows of seats 310. As shown in FIG. 8, a row 312 may include two seats 310 on either side of an aisle 313. However, the row 312 may include more or less seats 310 than shown. Additionally, the internal cabin 230*c* may include more aisles than shown.

Passenger service units (PSUs) 314 are secured between an outboard wall 302 and the ceiling 304 on either side of the aisle 313. The PSUs 314 extend between a front end and rear end of the internal cabin 230*c*. For example, a PSU 314 may be positioned over each seat 310 within a row 312. Each PSU 314 may include a housing 316 that generally contains vents, reading lights, an oxygen bag drop panel, an attendant request button, and other such controls over each seat 310 (or groups of seats) within a row 312.

Overhead stowage bin assemblies 318 are secured to the ceiling 304 and/or the outboard wall 302 above and inboard from the PSU 314 on either side of the aisle 313. The overhead stowage bin assemblies 318 are secured over the seats 310. The overhead stowage bin assemblies 318 extend between the front and rear end of the internal cabin 230*c*. Each stowage bin assembly 318 may include a pivot bin or bucket 320 pivotally secured to a strongback (hidden from view in FIG. 81). The overhead stowage bin assemblies 318 may be positioned above and inboard from lower surfaces of the PSUs 314. The overhead stowage bin assemblies 318 are configured to be pivoted open in order to receive passenger carry-on baggage and personal items, for example.

As used herein, the term "outboard" means a position that is further away from a central longitudinal plane 322 of the internal cabin 230c as compared to another component. The term "inboard" means a position that is closer to the central longitudinal plane 322 of the internal cabin 230c as compared to another component. For example, a lower surface of a PSU 314 may be outboard in relation to a stowage bin assembly 318.

As shown, a plurality of light sensors 112 and lighting assemblies 118 are secured to the ceiling 304. In particular, the light sensors 112 and the lighting assemblies 118 are disposed over the aisle 313. Objects, such as galley carts and trays, may be moved within the aisle.

Figure 9:
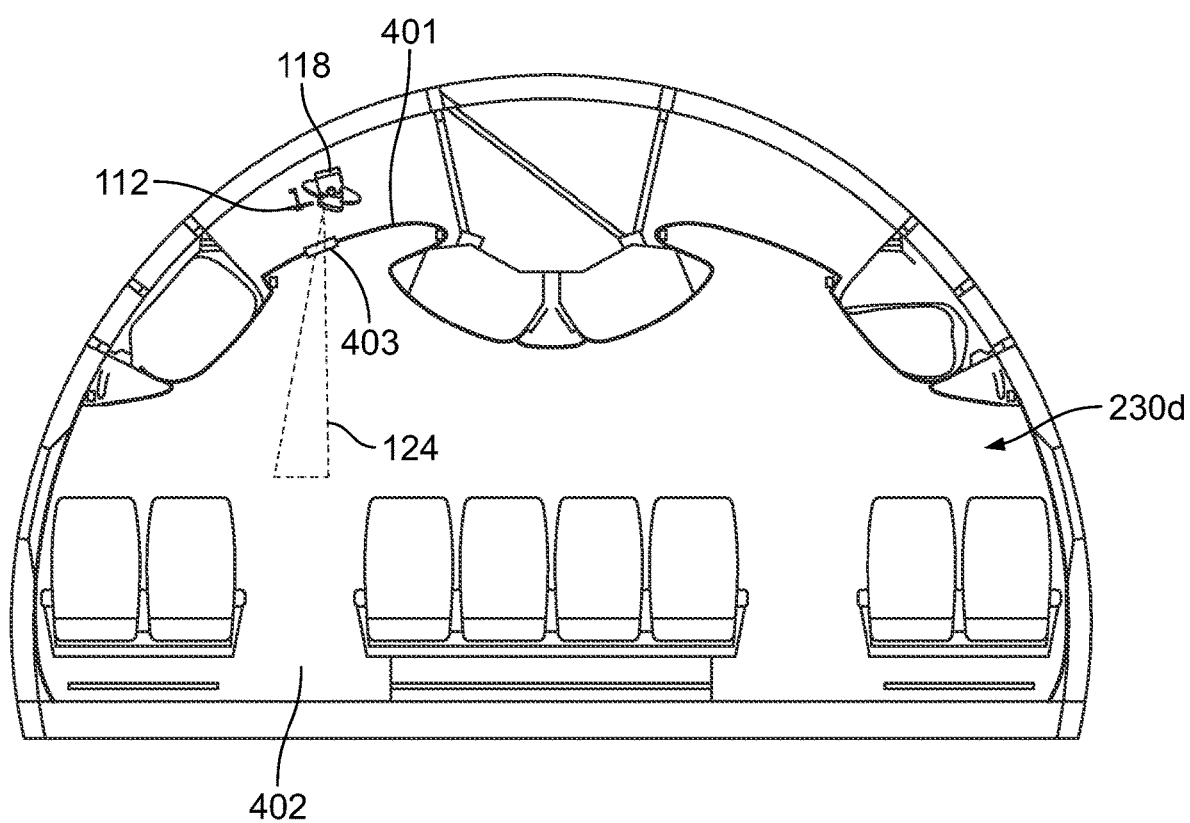
FIG. 9 illustrates an axial cross-sectional view of an internal cabin of an aircraft, according to an embodiment of the present disclosure.

FIG. 9 illustrates an axial cross-sectional view of an internal cabin 230d of an aircraft, according to an embodiment of the present disclosure. The internal cabin 230d is an example of the internal cabin 230 shown in FIG. 6. As shown, the light sensor 112 and the lighting assembly 118 can be positioned above a ceiling 401. An aperture 403 is formed through the ceiling 401 and allows the light sensor 112 to receive light tracking signals 110 (shown in FIG. 1) therethrough, and the lighting assembly 118 to emit the illuminating light 124 therethrough into an aisle 402.

When objects (such as the object 102 shown in FIG. 1) are not within the aisle 402, the lighting assembly 118 may be operated to illuminate a particular area within the internal cabin 230d. Referring to FIGS. 1 and 9, for example, during a boarding process, an attendant may operate the lighting assembly 118 to emit the illuminating light 124 in a specific color, which may be used to direct a passenger toward a designated seat. As such, in addition to illuminating objects, as described herein, embodiments of the present disclosure may also be used in relation to way-finding within the internal cabin 230d.

As shown in FIG. 9, the light sensor 112 and the lighting assembly 118 may be disposed above the ceiling 401. The aperture 403 may include a window, such as a plastic window that blends in with the ceiling 401. The window may not be readily discernable when the lighting assembly 118 is deactivated.

Figure 10:
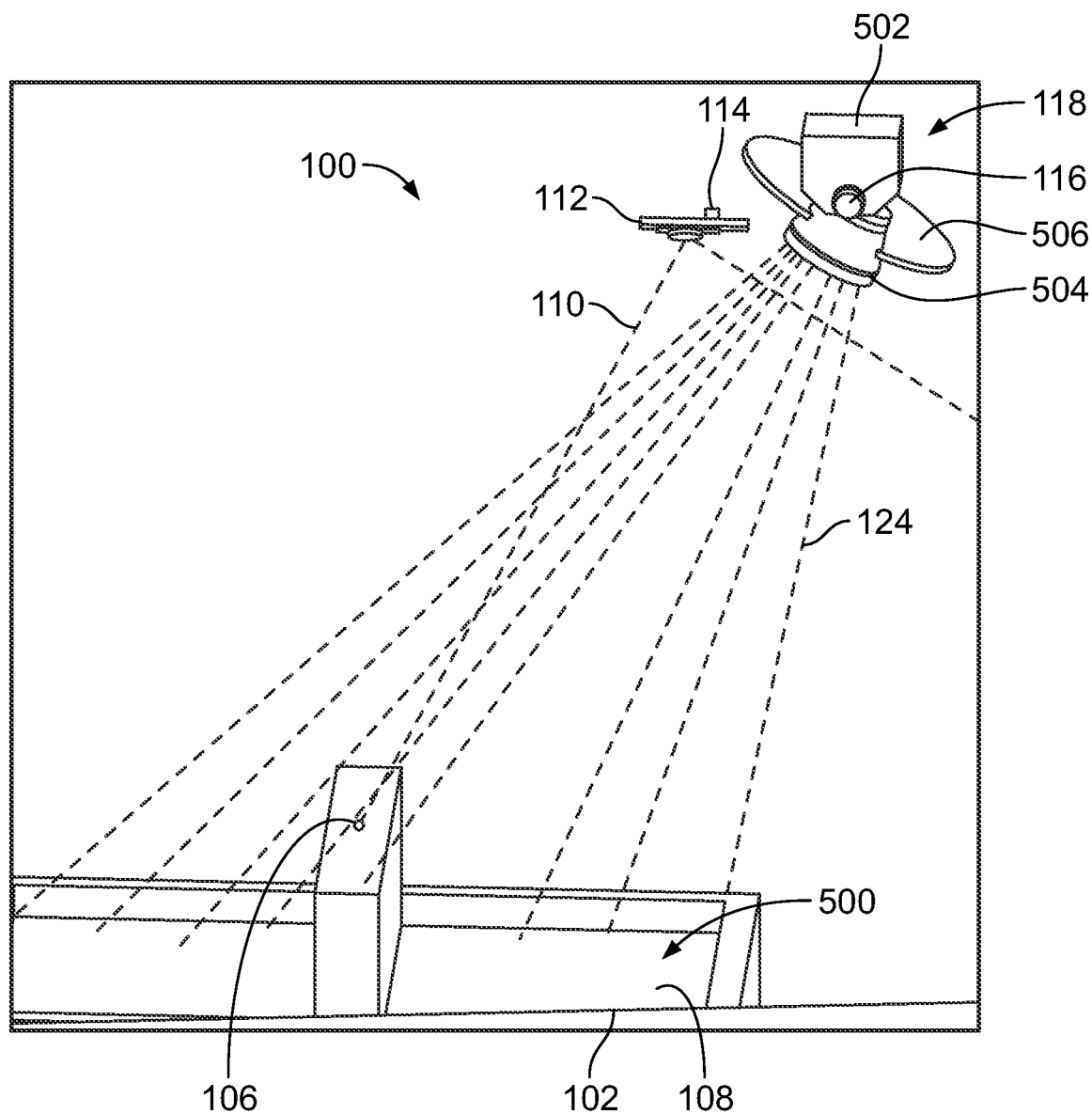
FIG. 10 illustrates a perspective view of a lighting assembly emitting illuminating light onto a work surface of an object, according to an embodiment of the present disclosure.

FIG. 10 illustrates a perspective view of the lighting assembly 118 emitting the illuminating light 124 onto a work surface 500 (such as the top surface 108) of an object 102 (such as a galley cart or tray), according to an embodiment of the present disclosure. In at least one embodiment, the lighting assembly 118 includes a gimbal bracket 502 and a light projector 504 pivotally coupled to the gimbal bracket 502, such as via one or more pivot axles. The actuator 116 is operatively coupled to the light projector 504 so as to pivot the light projector 504 in relation to the gimbal bracket 502. The light projector 504 may be a spot light. As another example, the light projector 504 may be a reading light, such as may be typically used with a PSU. As another example, the light projector 504 may be an attendant work light, such as may be typically used in galleys of an aircraft.

As described herein, the light sensor 112 detects the light tracking signal 110. The lighting control unit 114 operates the actuator 116 based on the light tracking signal 110, as detected by the light sensor 112, to move the light projector 504 to emit the illuminating light 124 onto the work surface 500.

In at least one embodiment, the light projector 504 is configured to shape the illuminating light 124 to be localized to (that is, does not wash or flood onto other areas) the work surface 500 (for example, shaping the illuminating light to match the target surface that is desired to be illuminated). In at least one embodiment, the lighting assembly 118 further includes a rotatable slide holder 506, which includes one or more slides that are configured to shape the illuminating light 124 to be localized on the work surface 500.

Figure 11:
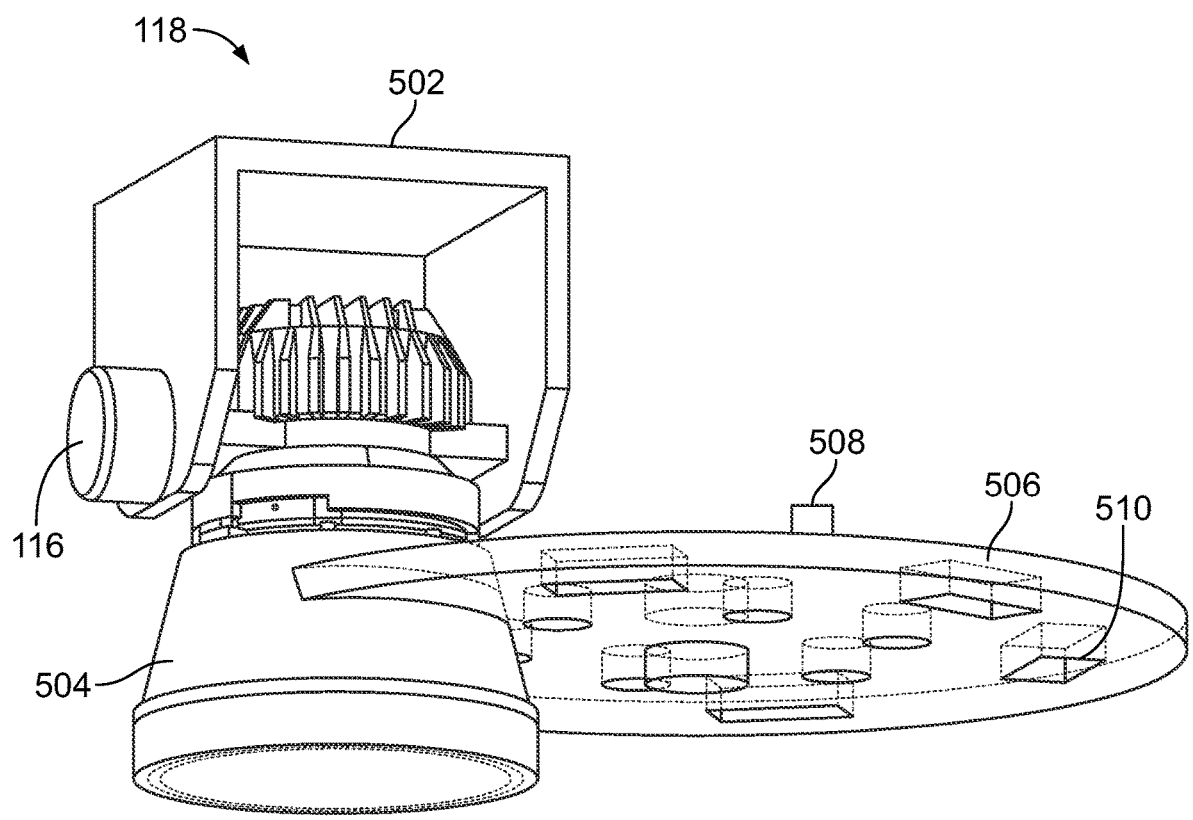
FIG. 11 illustrates a perspective view of the lighting assembly of FIG. 10.
Figure 12:
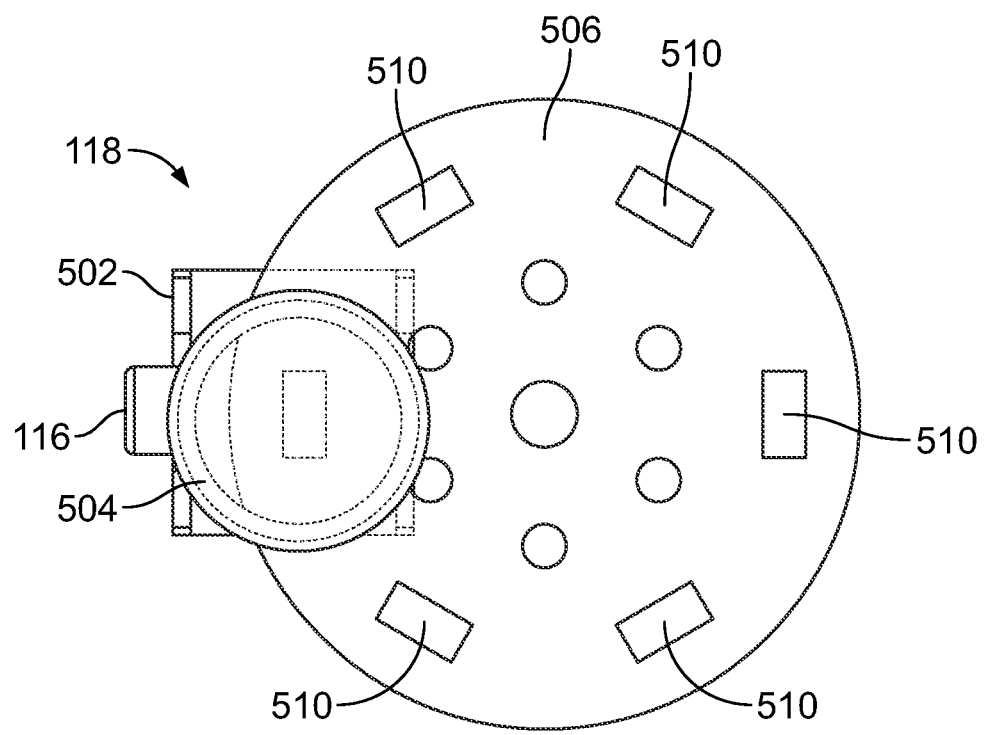
FIG. 12 illustrates a bottom view of the lighting assembly of FIG. 10.

FIG. 11 illustrates a perspective view of the lighting assembly 118 of FIG. 10. FIG. 12 illustrates a bottom view of the lighting assembly 118 of FIG. 10. Referring to FIGS. 11 and 12, an actuator 508, such as a motor, is operatively coupled to the slide holder 506. The actuator 508 is configured to rotate the slide holder 506 to move different slides 510 within the light projector 504. The slides 510 shape the illuminating light 124 (shown in FIG. 10) to be shaped as desired, such as to match the work surface 500.

Referring to FIGS. 1 and 10-12, the lighting control unit 114 may also be in communication with the actuator 508. The lighting control unit 114 can operate the actuator 508 to shift different slides 510 into the light projector 504 based on the position of the object 102. For example, as the object 102 moves to different positions, different slides 510 may be selectively moved into the light projector 504 to alter the shape of the illuminating light 124 in order to ensure that the work surface 500 is illuminated, as desired. Optionally, the lighting assembly 118 may not include the slide holder 506 or the actuator 508.

Figure 13:
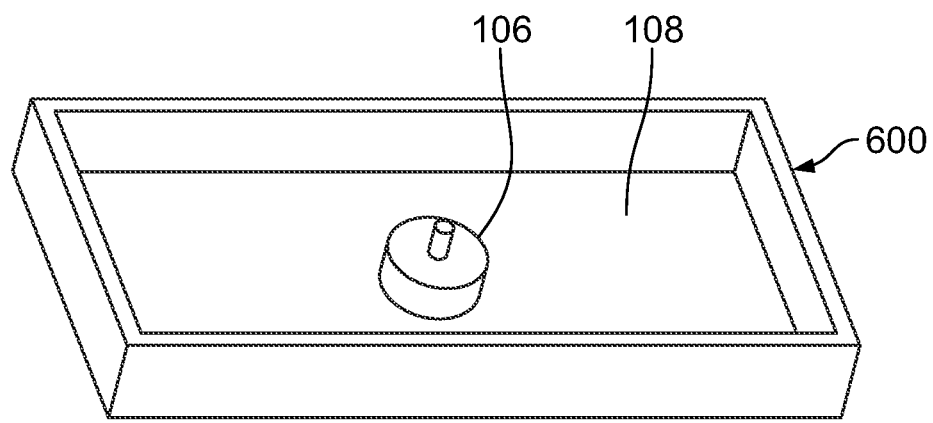
FIG. 13 illustrates a perspective top view of a tray, according to an embodiment of the present disclosure.

FIG. 13 illustrates a perspective top view of a tray 600, according to an embodiment of the present disclosure. The tray 600 is an example of the object 102, shown in FIG. 1. The tray 600 is configured to hold beverages, snacks, and/or the like. The beacon 106 is disposed on the top surface 108 of the tray 600. The beacon 106 can be fixed to the top surface 108. Optionally, the beacon 106 can be removably supported on the top surface 108.

Figure 14:
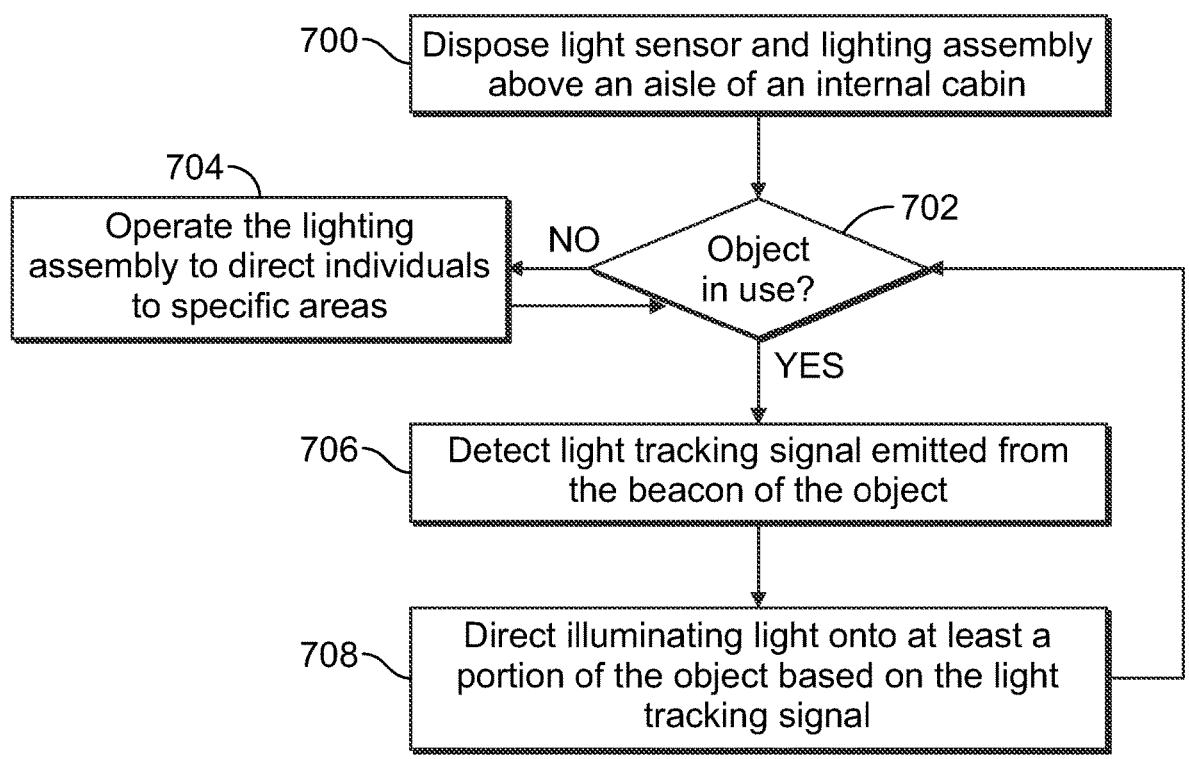
FIG. 14 illustrates a flow chart of a method for illuminating at least a portion of an object within an enclosed space, according to an embodiment of the present disclosure.

FIG. 14 illustrates a flow chart of a method for illuminating at least a portion of an object within an enclosed space, according to an embodiment of the present disclosure. Referring to FIGS. 1 and 14, at 700, the light sensor 112 and the lighting assembly 118 are disposed within the enclosed space 104, such as above an aisle of an internal cabin.

At 702, it is determined whether or not the object 102 is in use. If the object 102 is not in use, the method may proceed to 704, at which the lighting assembly 118 (such as via the user interface 126) may operate as a way-finder to direct individuals to specific areas. In an example, the attendant engages the user interface 126 to active the lighting assembly 118 into a way-finding mode to emit a specific colored illuminating light 124 at a location of the aisle by a designated seat for a passenger. The method then returns to 702.

If, at 702, the object 102 is in use (such as within the aisle), the light sensor 112 detects the light tracking signal 110 emitted from the beacon 106 of the object 102. At 708, the lighting control unit 114 then operates the lighting assembly 118 to direct the illuminating light 124 onto at least a portion of the object 102 (such as a work surface) based on the light tracking signal 110, as detected by the light sensor 112. The method then returns to 702.

Figure 15:
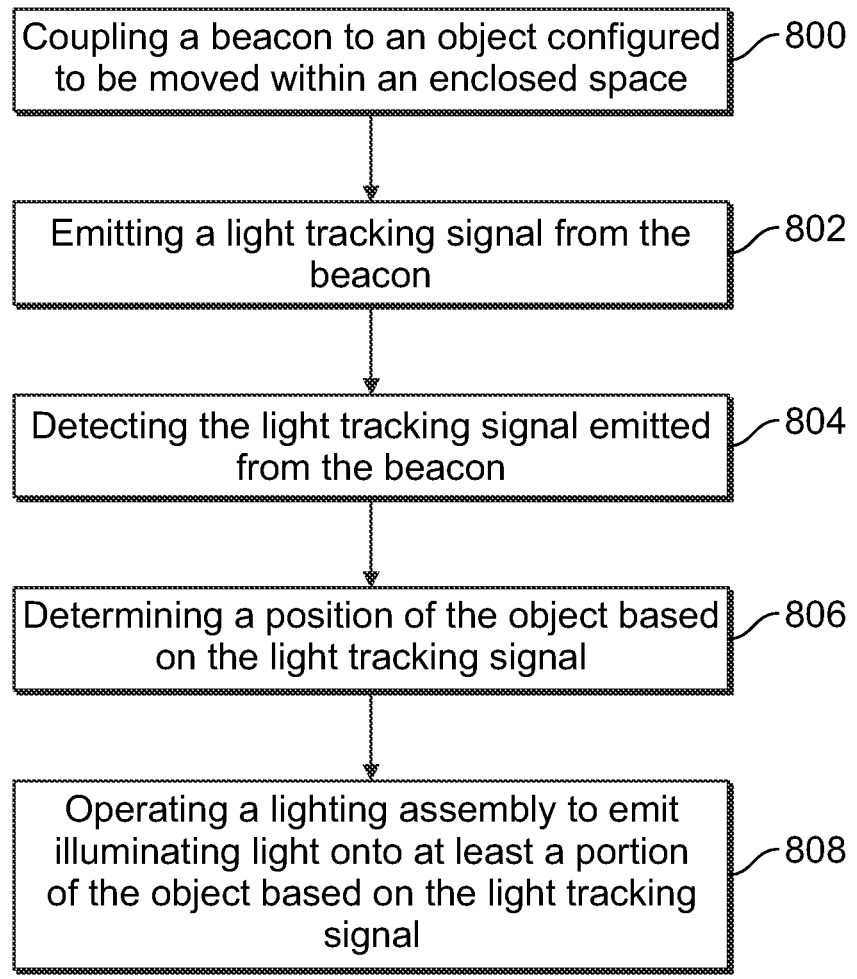
FIG. 15 illustrates a flow chart of a method for illuminating at least a portion of an object within an enclosed space, according to an embodiment of the present disclosure.

FIG. 15 illustrates a flow chart of a method for illuminating at least a portion of an object within an enclosed space, according to an embodiment of the present disclosure. Referring to FIGS. 1 and 15, the method includes coupling, at 800, a beacon 106 to an object 108 configured to be moved within the enclosed space 104; emitting, at 802, a light tracking signal 110 from the beacon 106; detecting, at 804, by a light sensor 112, the light tracking signal 110 emitted from the beacon 106; determining, at 806, by a lighting control unit 114 in communication with the light sensor 112, a position of the object 102 within the enclosed space 104 based on the light tracking signal 110 as detected by the light sensor 112; and operating, at 808, by the lighting control unit 114, a lighting assembly 118 to emit illuminating light 124 onto the at least a portion of the object 102 based on the light tracking signal 110 as detected by the light sensor 112.

In at least one embodiment, the method also includes providing, by the lighting assembly 118, way-finding illumination for individuals within the enclosed space 104 when the light sensor 112 does not detect the light tracking signal 110.

In at least one embodiment, said operating includes deactivating the lighting assembly 118 when the light sensor 112 no longer detects the light tracking signal 110.

The enclosed space 104 may be an internal cabin of a vehicle. The object 102 may include one of a galley cart or a tray. The beacon 106 may include a light emitting diode (LED), and the light tracking signal 110 may include infrared light In at least one embodiment, said coupling comprises securing the beacon 106 to a top surface 108 of the object 102.

As described herein, embodiments of the present disclosure provide systems and methods for efficiently and effectively illuminating an object within an enclosed space, such as an internal cabin of a vehicle. Further, embodiments of the present disclosure provide systems and methods that direct illuminating light on an object without undesirably spilling the light into certain areas of an enclosed space.

Further, the disclosure comprises embodiments according to the following clauses:

Clause 1: A system for illuminating at least a portion of an object within an enclosed space, the system comprising:
an object configured to be moved within the enclosed space; and
a beacon coupled to the object, wherein the beacon is configured to emit a light tracking signal.

Clause 2. The system of Clause 1, further comprising a light sensor, wherein the light sensor is configured to detect the light tracking signal emitted from the beacon.

Clause 3. The system of Clause 2, wherein the light sensor comprises:
a circuit board;
a linear photo detector array coupled to the circuit board;
a lens; and
an infrared filter disposed between the photo detector array and the lens.

Clause 4. The system of Clauses 2 or 3, further comprising a lighting control unit in communication with the light sensor, wherein the lighting control unit is configured to determine a position of the object within the enclosed space based on the light tracking signal as detected by the light sensor.

Clause 5. The system of Clause 4, further comprising a lighting assembly in communication with the lighting control unit, wherein the lighting control unit is configured to operate the lighting assembly to emit the illuminating light onto the at least a portion of the object based on the light tracking signal as detected by the light sensor.

Clause 6. The system of Clause 5, wherein the lighting assembly is configured to provide way-finding illumination for individuals within the enclosed space when the light sensor does not detect the light tracking signal.

Clause 7. The system of Clauses 5 or 6, wherein the lighting assembly comprises:
a gimbal bracket;
a light projector pivotally coupled to the gimbal bracket; and
an actuator operatively coupled to the light projector so as to pivot the light projector in relation to the gimbal bracket.

Clause 8. The system of Clause 7, wherein the lighting assembly further comprises a rotatable slide holder that includes one or more slides that are configured to shape the illuminating light.

Clause 9. The system of any of Clauses 5-8, wherein the lighting control unit is configured to deactivate the lighting assembly when the light sensor no longer detects the light tracking signal.

Clause 10. The system of any of Clauses 1-9, wherein the enclosed space is an internal cabin of a vehicle.

Clause 11. The system of any of Clauses 1-10, wherein the object comprises one of a galley cart or a tray.

Clause 12. The system of any of Clauses 1-11, wherein the beacon is secured to a top surface of the object.

Clause 13. The system of any of Clauses 1-12, wherein the beacon comprises a light emitting diode (LED), and wherein the light tracking signal comprises infrared light.

Clause 14. A method for illuminating at least a portion of an object within an enclosed space, the method comprising:
coupling a beacon to an object configured to be moved within the enclosed space; and
emitting a light tracking signal from the beacon.

Clause 15. The method of claim 14, further comprising detecting, by a light sensor, the light tracking signal emitted from the beacon.

Clause 16. The method of Clause 15, further comprising determining, by a lighting control unit in communication with the light sensor, a position of the object within the enclosed space based on the light tracking signal as detected by the light sensor.

Clause 17. The method of Clause 16, further comprising operating, by the lighting control unit, a lighting assembly in communication with the lighting control unit, wherein said operating comprises operating the lighting assembly to emit the illuminating light onto the at least a portion of the object based on the light tracking signal as detected by the light sensor.

Clause 18. The method of Clause 17, further comprising providing, by the lighting assembly, way-finding illumination for individuals within the enclosed space when the light sensor does not detect the light tracking signal.

Clause 19. The method of Clauses 17 or 18, wherein said operating comprises deactivating the lighting assembly when the light sensor no longer detects the light tracking signal.

Clause 20. The method of any of Clauses 14-19, wherein the enclosed space is an internal cabin of a vehicle.

Clause 21. The method of any of Clauses 14-20, wherein the object comprises one of a galley cart or a tray.

Clause 22. The method of any of Clauses 14-21, wherein said coupling comprises securing the beacon to a top surface of the object.

Clause 23. The method of any of Clauses 14-22, wherein the beacon comprises a light emitting diode (LED), and wherein the light tracking signal comprises infrared light.

Clause 24. A vehicle comprising:
an internal cabin; and
a system for illuminating at least a portion of an object within the internal cabin, the system including:
an object configured to be moved within the internal cabin;
a beacon coupled to the object, wherein the beacon is configured to emit a light tracking signal;

a light sensor, wherein the light sensor is configured to detect the light tracking signal emitted from the beacon;

a lighting control unit in communication with the light sensor, wherein the lighting control unit is configured to determine a position of the object within the internal cabin based on the light tracking signal as detected by the light sensor; and a lighting assembly in communication with the lighting control unit, wherein the lighting control unit is configured to operate the lighting assembly to emit the illuminating light onto the at least a portion of the object based on the light tracking signal as detected by the light sensor.

Clause 25. The vehicle of Clause 24, wherein the lighting assembly is configured to provide way-finding illumination for individuals within the internal cabin when the light sensor does not detect the light tracking signal.

Clause 26. The vehicle of Clauses 24 or 25, wherein the lighting control unit is configured to deactivate the lighting assembly when the light sensor no longer detects the light tracking signal.

Clause 27. The vehicle of any of Clauses 24-26, wherein the object comprises one of a galley cart or a tray.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system for illuminating at least a portion of an object within an enclosed space, the system comprising:
    an object configured to be moved within the enclosed space;
    a beacon coupled to the object, wherein the beacon is configured to emit a light tracking signal; and
    a light sensor configured to detect the light tracking signal emitted from the beacon, wherein the light sensor comprises:
       a circuit board;
       a linear photo detector array coupled to the circuit board;
       a lens; and
       an infrared filter disposed between the photo detector array and the lens.

2. The system of claim 1, further comprising a lighting control unit in communication with the light sensor, wherein the lighting control unit is configured to determine a position of the object within the enclosed space based on the light tracking signal as detected by the light sensor.

3. The system of claim 2, further comprising a lighting assembly in communication with the lighting control unit, wherein the lighting control unit is configured to operate the lighting assembly to emit illuminating light onto the at least a portion of the object based on the light tracking signal as detected by the light sensor.

4. The system of claim 3, wherein the lighting assembly is configured to provide way-finding illumination for individuals within the enclosed space when the light sensor does not detect the light tracking signal.

5. The system of claim 3, wherein the lighting assembly comprises:
    a gimbal bracket;
    a light projector pivotally coupled to the gimbal bracket; and
    an actuator operatively coupled to the light projector so as to pivot the light projector in relation to the gimbal bracket.

6. The system of claim 5, wherein the lighting assembly further comprises a rotatable slide holder that includes one or more slides that are configured to shape the illuminating light.

7. The system of claim 3, wherein the lighting control unit is configured to deactivate the lighting assembly when the light sensor no longer detects the light tracking signal.

8. The system of claim 1, wherein the enclosed space is an internal cabin of a vehicle.

9. The system of claim 1, wherein the object comprises one of a galley cart or a tray.

10. The system of claim 1, wherein the beacon is secured to a top surface of the object.

11. The system of claim 1, wherein the beacon comprises a light emitting diode (LED), and wherein the light tracking signal comprises infrared light.

12. A method for illuminating at least a portion of an object within an enclosed space, the method comprising:
coupling a beacon to the object configured to be moved within the enclosed space;
emitting a light tracking signal from the beacon; and
detecting, by a light sensor, the light tracking signal emitted from the beacon, wherein the light sensor comprises:
a circuit board;
a linear photo detector array coupled to the circuit board;
a lens; and
an infrared filter disposed between the photo detector array and the lens.

13. The method of claim 12, further comprising determining, by a lighting control unit in communication with the light sensor, a position of the object within the enclosed space based on the light tracking signal as detected by the light sensor.

14. The method of claim 13, further comprising operating, by the lighting control unit, a lighting assembly in communication with the lighting control unit, wherein said operating comprises operating the lighting assembly to emit illuminating light onto the at least a portion of the object based on the light tracking signal as detected by the light sensor.

15. The method of claim 14, further comprising providing, by the lighting assembly, way-finding illumination for individuals within the enclosed space when the light sensor does not detect the light tracking signal.

16. The method of claim 12, wherein the enclosed space is an internal cabin of a vehicle, and wherein the object comprises one of a galley cart or a tray.

17. A vehicle comprising:
an internal cabin; and
a system including:
an object configured to be moved within the internal cabin;
a beacon coupled to the object, wherein the beacon is configured to emit a light tracking signal;
a light sensor configured to detect the light tracking signal emitted from the beacon, wherein the light sensor comprises (a) a circuit board, (b) a linear photo detector array coupled to the circuit board, (c) a lens, and (d) an infrared filter disposed between the photo detector array and the lens;
a lighting control unit in communication with the light sensor, wherein the lighting control unit is configured to determine a position of the object within the internal cabin based on the light tracking signal as detected by the light sensor; and
a lighting assembly in communication with the lighting control unit, wherein the lighting control unit is configured to operate the lighting assembly to emit illuminating light onto at least a portion of the object based on the light tracking signal as detected by the light sensor.

18. The vehicle of claim 17, wherein the lighting assembly is configured to provide way-finding illumination for individuals within the internal cabin when the light sensor does not detect the light tracking signal.

19. The vehicle of claim 17, wherein the object comprises one of a galley cart or a tray.

20. The vehicle of claim 17, wherein the lighting control unit is configured to deactivate the lighting assembly when the light sensor no longer detects the light tracking signal.

* * * * *